(12) United States Patent
Sakai et al.

(10) Patent No.: US 7,708,444 B2
(45) Date of Patent: May 4, 2010

(54) SURFACE LIGHT SOURCE DEVICE

(75) Inventors: Seiji Sakai, Kikuchi-gun (JP); Takuya Sakamoto, Kikuchi-gun (JP); Toshiyuki Yoneda, Tokyo (JP)

(73) Assignee: Mitsubishi Denki Kabushiki Kaisha, Chiyoda-ku, Tokyo (JP)

( * ) Notice: Subject to any disclaimer, the term of this patent is extended or adjusted under 35 U.S.C. 154(b) by 0 days.

(21) Appl. No.: 11/033,492

(22) Filed: Jan. 12, 2005

(65) Prior Publication Data

US 2005/0174806 A1  Aug. 11, 2005

(30) Foreign Application Priority Data

Feb. 5, 2004 (JP) .............................. 2004-029723

(51) Int. Cl.
F21V 7/00 (2006.01)

(52) U.S. Cl. ...................... 362/615; 362/608; 362/622; 362/627

(58) Field of Classification Search ......... 362/235–247, 362/615, 611–613, 600, 606–608, 246, 621–622, 362/616–620, 623–629; 349/61, 64, 62, 349/65
See application file for complete search history.

(56) References Cited

U.S. PATENT DOCUMENTS

| 5,618,096 | A | * | 4/1997 | Parker et al. | ................. | 362/629 |
| 6,065,845 | A | * | 5/2000 | Miyazaki | ..................... | 362/26 |
| 6,979,095 | B2 | * | 12/2005 | Min et al. | .................... | 362/611 |
| 2002/0001183 | A1 | * | 1/2002 | Shigehiro | ..................... | 362/23 |
| 2002/0054489 | A1 | * | 5/2002 | Hirayama | ..................... | 362/31 |
| 2004/0095743 | A1 | * | 5/2004 | Yu et al. | ....................... | 362/31 |
| 2004/0151006 | A1 | * | 8/2004 | Yang | .......................... | 362/558 |

FOREIGN PATENT DOCUMENTS

| CN | 2156559 | 2/1994 |
| JP | 2002-133932 | 5/2002 |
| JP | 2002-175713 | 6/2002 |
| JP | 2003-241191 | 8/2003 |
| JP | 2004-14527 | 1/2004 |

OTHER PUBLICATIONS

Chinese Office Action dated Jul. 21, 2006.

* cited by examiner

Primary Examiner—Jong-Suk (James) Lee
Assistant Examiner—Robert May
(74) Attorney, Agent, or Firm—Buchanan Ingersoll & Rooney PC

(57) ABSTRACT

A primary object of the present invention is to provide a surface light source device attaining a homogenous luminance distribution on a light emitting surface of a light guiding plate in which a dot light source having a high directivity of emitted light is employed. The device includes: a light guiding plate 5 including a plurality of primary holes in such a manner as to locate each dot light source 3 inside; and dot printing 7a being employed as an auxiliary light source means which diffuses light from the dot light source 3 to the position between dot light sources 3 being adjacent to each other, wherein the dot printing 7 is provided at a base of the light guiding plate 5 and a middle point of the connected dot light sources 3 being adjacent to each other.

10 Claims, 9 Drawing Sheets

DIRECTION OF ALINED DOT LIGHT SOURCES

DIRECTION OF ALINED DOT LIGHT SOURCES

SURFACE LIGHT SOURCE DEVICE

BACKGROUND OF THE INVENTION

The present invention relates to a surface light source device and other display device employing the surface light source device. More particularly, the present invention relates to the display devices such as a signboard and an induction light employing a transmittance type of a liquid crystal display and a display a panel, which displays a letter or a figure, and the surface light source device supplying illumination light, which employs a plurality of dot light sources such as a light emitting diode, to the display device.

SUMMARY OF THE INVENTION

A conventional surface light source device includes a light source such as an LED, a translucent material and a light guiding plate which guides light from a light receiving part to inside of the light guiding plate, and emits light on a surface. Around the light receiving part of the light guiding plate, there are provided a plurality of substantially circular-shaped holes substantially perpendicular to a light emitting surface, and there are formed mirrors on an inside surface of the holes. (For instance, refer to Japanese Unexamined Patent Publication No. 175713/2002.)

For the conventional surface light source device, since the light source is provided adjacent to an upright surface of the light guiding plate, light from the light source transmits through air between the light source and the light guiding plate, then the light is received on the upright surface of the light guiding plate. Since a refractive index of the light guiding plate is larger than the refractive index of air, an angle of irradiation becomes smaller than an angle of incidence at the upright surface of the light guiding plate. In other words, there has been a problem in deterioration of display quality because of the existence of light part and dark part around the light receiving part of the upright surface of the light guiding plate in which light from the light source is received.

The present invention is provided to solve problems described as above, and a primary object is to obtain a surface light source device which equates luminance distribution of a light emitting surface of the light guiding plate and avoids generating unevenness of luminance of the light emitting surface of the light guiding plate in which a dot light source having a higher directivity of emitted light is employed.

The secondary object of the present invention is to obtain a display device which is capable of obtaining an excellent display characteristic through employing above-mentioned surface light source device.

In the surface light source device related to the present invention, the light guiding plate consists of a plurality of primary holes in such a manner as to locate each dot light source within said plurality of primary holes, and it has an auxiliary light source means which diffuses light from dot light sources located between any two of dot light sources, the above-mentioned any two of dot light sources being adjacent to each other.

In the present invention, since the light guiding plate consists of a plurality of primary holes in such a manner as to locate each dot light source within said plurality of primary holes and it has an auxiliary light source means which diffuses light from dot light sources located between any two of dot light sources, the above-mentioned any two of dot light sources being adjacent to each other, it is possible to create a higher luminance part between dot light sources as if there is provided a light source. Therefore, through avoid providing high luminance part only around the dot light sources, it is possible to improve the homogeneous luminance by having a higher luminance successively at the dot light sources and between any two of dot light sources being adjacent to each other.

DETAILED DESCRIPTION

Embodiment 1

Figure 1:
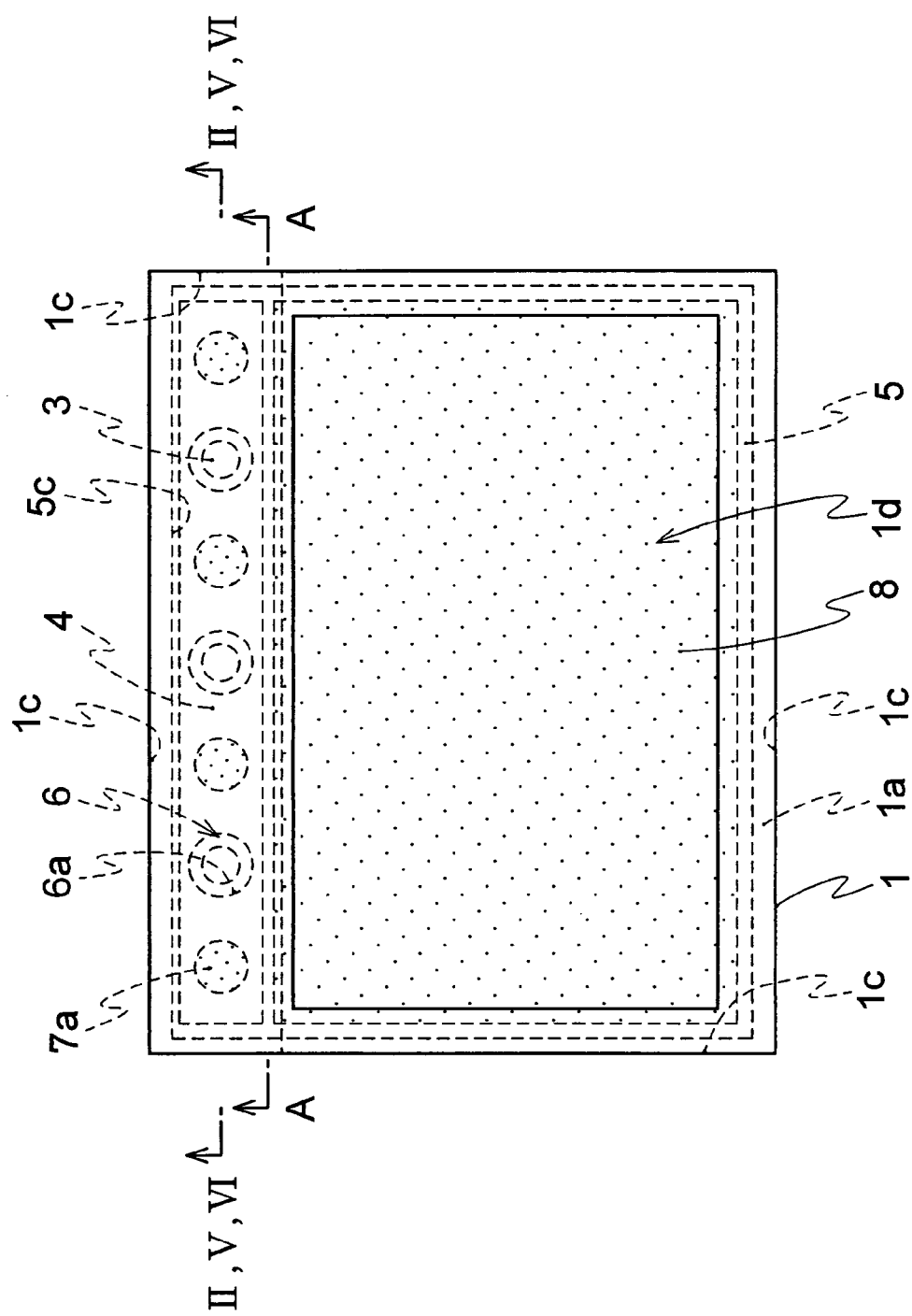
FIG. 1 shows a plan view of the basic construction of the surface light source device in Embodiment 1 of the present invention.
Figure 2:
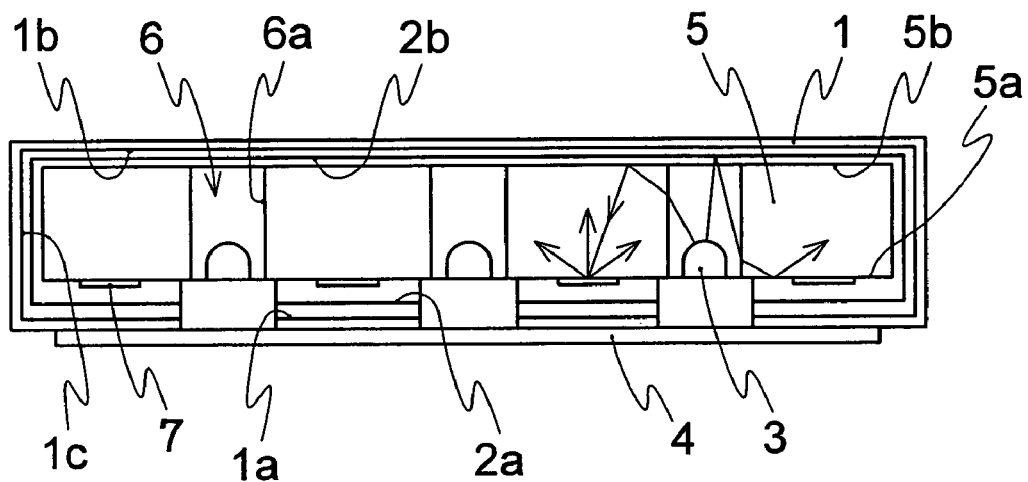
FIG. 2 shows a fragmentary sectional view taken along II-II line of the surface light source device of FIG. 1.
Figure 3:
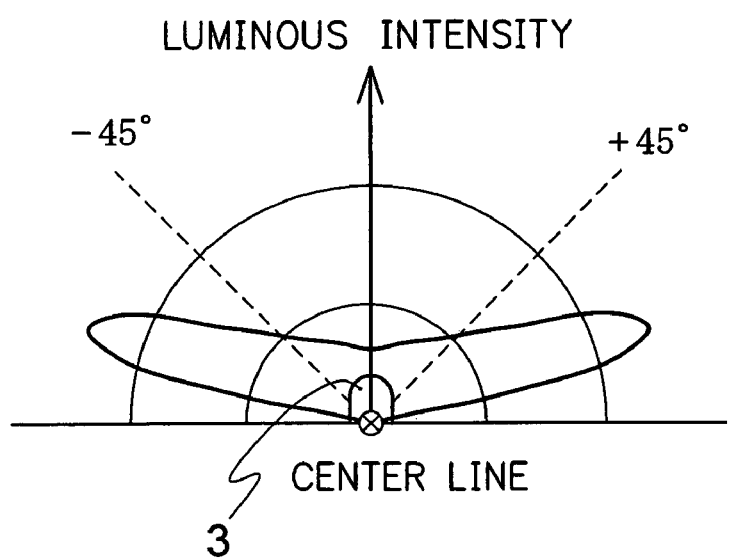
FIG. 3 shows a luminous intensity distribution diagram showing a luminous intensity distribution of emitted light from an LED, which is employed for dot light source in Embodiment 1 of the present invention.

FIG. 1 shows a plan view of a basic construction of a surface light source device in Embodiment 1 of the present invention, FIG. 2 shows a fragmentary sectional view taken along II-II line of the surface light source device of FIG. 1, and FIG. 3 is a luminous intensity distribution diagram showing a luminous intensity distribution of emitted light from an LED which is employed as the dot light source in Embodiment 1 of the present invention. In FIGS. 1 and 2, a casing 1 is composed of a base 1a, a top 1b and four upright surfaces 1c, and the base 1a includes an opening 1d.

The casing 1 is formed to prevent light from leaking as much as possible, and in order for light to proceed to the opening 1d, there is formed a reflective part 2 (hereinafter, reflective part 2 located on base 1a is "primary reflective part 2a" and reflective part 2 located on top 1b is "secondary reflective part 2b"). Reflective part 2 is composed of a material which is a mixture of either PP (polypropylene) or PET (polypropylene terephthalate) and either barium sulfate or titanium oxide, a material which is formed fine foam on resin or a material which is painted by a paint containing such as titanium oxide on a metallic plate.

As a dot light source 3, light emitting diode (hereinafter, LED) and laser diode (hereinafter, LD) can be employed. In Embodiment 1, a white light LED was employed.

Compared with the white light LED, by employing an LED, which has the efficient light emission and monochromatic color emission of red, green or blue being capable of combining a transmit characteristic and a light emitting spectrum of red, green or blue of a color filter included in a liquid crystal display, it is possible to obtain a display device with large color reappearance area.

In addition, by controlling LED independently for each color, the color of emitted light from the surface light source device can be changed easily.

On a rectangular substrate 4 for a dot light source, a plurality of dot light sources 3 is provided regularly spaced apart from one to the other along the dot light substrate 4, therefore, the dot light sources 3 are positioned according to the dot light source substrate 4. The dot light source substrate 4 is provided on at least one upright surface 1c of the casing 1, therefore, a plurality of the dot light sources 3 is provided along the upright surface 1c of the casing 1.

The dot light sources 3 are also electrically connected to the dot light source substrate 4, and supply electric signals coming from outside to the dot light sources 3 through the dot light source substrate 4.

There is provided a light guiding plate 5 on the top of primary reflective part 2a located inside the casing 1, and the light guiding plate 5 transmits light from the dot light source 3 to the opening 1d. The light guiding plate 5 has a function of transmitting light of a resin plate or a glass substrate made of such as polypropylene terephthalate (PET), acrylic (PMMA) or polycarbonate (PC) which has a refractive index around 1.4 to 1.6.

The light guiding plate 5 includes a plurality of primary holes 6 in such a manner as to locating the each dot light source 3 within said plurality holes and corresponding to the each dot light source 3, and in Embodiment 1, the primary holes 6 are formed in such a manner as to penetrate between the base 5a and top 5b of the light guiding plate 5.

The sectional shape of the primary holes 6 is selected from any shapes such as circle, square or hexagon, however, an inner side 6a of the primary hole 6 is preferably provided perpendicularly to the base 5a or top 5b of the light guiding plate 5 and includes a cladding layer which is not uneven.

At least by providing a secondary reflective part 2b at the position of the primary hole 6 located at a top 5b side of the light guiding plate 5, it is possible to control emitted light from directly above the dot light sources 3.

Also, in case the primary hole 6 is located between the base 5a of the light guiding plate 5 and inside the light guiding plate 5, instead of being penetrated between the base 5a and the top 5b of the light guiding plate 5, by providing a reflective plate on the top of primary hole 6 located directly above the dot light source 3, it is possible to shield light being transmitted to the opening 1d of the casing 1 from the dot light source 3 by a smaller area of the reflective plate compared with an arrangement which is to provide the reflective part 2b at the top 5b of light guiding plate 5.

In order to reduce the loss of refection, it is desirable that the reflective index of the reflective part 2, including the primary reflective part 2a and the secondary reflective part 2b, is more than 90%. Also, by increasing the reflective index through the use of a white upright surface inside the casing 1, reflection of inside the casing 1 is increased and the loss of light is reduced. In addition, the primary reflective part 2a and secondary reflective part 2b are composed of different members, however, through adapting the same member and united formation, it is possible to increase the efficiency of workability for assembling the casing 1 through reduction of the number of components. Furthermore, when the casing 1 is capable of having the function of the reflective part 2, which is composed of the primary reflective part 2a and the secondary reflective part 2b, it is possible to reduce the number of components and it is desirable.

The light guiding plate 5 consists of an auxiliary light source means 7 (i.e., auxiliary light source diffusing means 7) which is located between any two of dot light sources being adjacent to each other and diffuses light from the light source. In Embodiment 1, with respect to the auxiliary light source means 7, there is provided dot printing at the position, which is a middle point of a straight line connecting the dot light sources 3 being adjacent to each other on the base 5a of the light guiding plate 5. A plurality of dot light sources 3 forms a straight line and create a series of dot light sources, and on this straight line, there is also provided dot printing 7a at the position which corresponds to the middle point between two ends of the dot light sources 3 and the upright surfaces 1c of the light guiding plate 5.

The above-mentioned dot printing 7a is fine pattern printing given on the surface of the light guiding plate 5 by white diffused ink, and the shape, size, tone, density and ink color of dots are decided to be optimized according to the display quality of the top 5a of the light guiding plate 5. In terms of the dot printing 7a, for instance in Embodiment 1, the center, which is the middle point of a connected line between the adjacent dot light sources 3, has a dense dot density and the density becomes low as apart from the center.

On the light guiding plate 5, there is provided a plurality of optical sheets, not shown in Figures, which are to use light effectively, and there is provided an element of a liquid crystal display, not shown in Figures, on the light guiding plate 5 through the optical sheets.

The optical sheets have an arrangement of a lens sheet being put between the diffusion sheets. In case an increase of luminance is required, a plurality of lens sheets is combined in consideration of a direction of prism of the sheets created on the sheet surface. In addition, in case diffusibility needs to be increased, it is possible to employ more than two diffusion sheets. Depending on a characteristic of the luminous intensity distribution, one lens sheet or none of the lens sheet can be employed. Also, a combination of a protection sheet, lens sheet and polarized sheet can be employed. Or it is possible not to use any sheets.

As a display part located on the top of the surface light source device, there can be employed an element of a liquid crystal display which is applied an auxiliary refractivity of liquid crystal or a printed matter on which a letter or a figure is printed. And in Embodiment 1, an element of the liquid crystal display is employed as the display part. The element of the liquid crystal is composed of a colored layer on either top side or bottom side of a substrate not shown in Figures, a light shielding layer, a thin film transistor (hereinafter, TFT) which becomes a switching element, a TFT array substrate and a counter substrate in which an electrode of pixel electrode and lines are formed, a spacer which spaces regularly apart from one substrate to the other substrate, a seal material which mounts two substrates, a block material which blocks liquid crystal after injecting liquid crystal to the two substrates, an alignment film which gives an initial alignment for liquid crystal and a polarizer plate which polarizes light. However, in the present invention, a conventional element of liquid crystal display is employed, therefore explanations are omitted.

A liquid crystal display is composed of the liquid crystal element provided on the top of the surface light source device and a circuit substrate which drives the element of the liquid crystal display and not shown in Figures.

Following is an explanation of an optical path for light which is emitted from the dot light source 3 and irradiated from the light guiding plate 5 then received in the element of the liquid crystal display.

White light emitted from the dot light source 3 is reflected directly or through the secondary reflective part 2b, and it is received at an inside surface 6a of a primary hole 6 which is a light receiving surface of the light guiding plate 5.

Of the light which is received from angles against the inside surface 6a of the light guiding plate 5, there is surface reflecting light at the inside surface 6a. The surface reflecting light reflected at the inside surface 6a is reflected to a side of the secondary reflective part 2b and transmits the space surrounded by the secondary reflective part 2 and the inside surface 6, then the surface reflect light is received at the inside surface 6a of the light guiding plate 5 again.

The LED of the dot light source 3 controls a directivity of emitted light by sealing an LED element using lens-shaped resin. For instance as shown in FIG. 3, as dextrogyratory is determined to be positive against a center line of an alignment direction for the LED element, when an LED, having the maximum luminous intensity of luminous intensity distribution at an angle of ±80° of emitted light from the LED, is employed as the dot light source 3 and the inside surface 6a of the light guiding plate is approximately vertical against the base 1a of the casing 1, an incidence angle $\phi_i$, which is the maximum luminous intensity of the luminous intensity distribution for the incident light against the inside surface 6a of the light guiding plate 5 becomes 10°. Therefore, most of light from the dot light source 3 is received at the inside surface 6a of the light guiding plate 5, and without surface reflection at the inside surface 6a and with less light arriving in the secondary reflective part 2b, it is possible to obtain the efficient light incidence for the light guiding plate 5 because of fewer loss of light at the secondary reflective part 2b.

Light received in the light guiding plate 5 transmits inside the light guiding plate 5 while repeating the total reflection at a boundary between the light guiding plate 5 and air layer. A portion of diffused reflecting light by the dot printing 7a is emitted around the light guiding plate 5, however, the light is received at the light guiding plate 5 through the reflective part 2 being provided the base 1a, the top 1b and the side 1c of the casing 1, and the light transmits inside the light guiding plate 5 apart from the light source.

Of light which transmits inside the light guiding plate 5, by diffused the reflection through dot printing 7a as the auxiliary light source means 7 formed at the base 5a of the light guiding plate 5, it is possible to increase luminance at the position of dot printing 7a as if a light source is provided compared with a position which is not provided the dot printing 7a. Especially, through providing the dot printing 7a at a position, which is the base 5 of the light guiding plate 5 and a middle point of a straight line connecting the dot light sources 3 between any two of dot light sources being adjacent to each other, it is possible to reduce the difference of the luminance between the adjacent dot light sources 3.

Figure 4A:
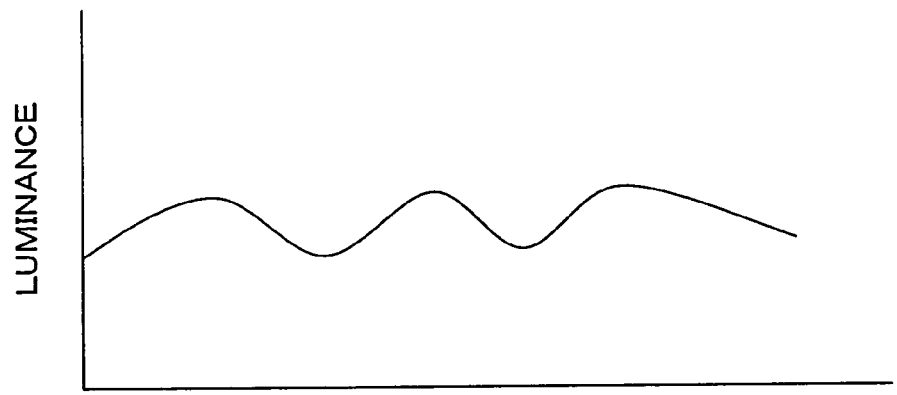
FIG. 4($a$) shows a luminous distribution of a light guiding plate when the light guiding plate is not composed of the auxiliary light source means 7, and FIG. 4($b$) shows a luminous distribution of a light guiding plate when the light guiding plate is composed of the auxiliary light source means 7.
Figure 4B:
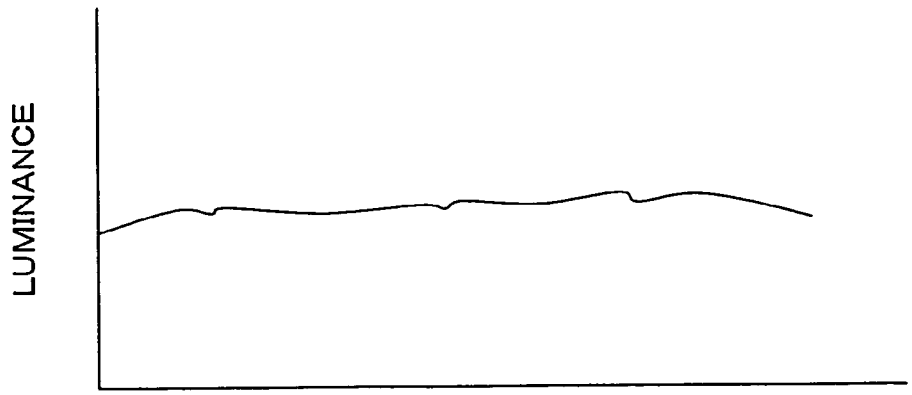

There is shown a comparison of the luminance distribution (FIG. 4(a)) of the light guiding plate 5 which is not composed of the auxiliary light source means 7 and the luminance distribution (FIG. 4(b)) of the light guiding plate 5 which is composed of the auxiliary light source means 7. FIG. 4(a) shows the luminance distribution diagram of a fragmentary sectional view taken along A-A line of the surface light source device of FIG. 1 when the light guiding plate, which is not composed of the auxiliary light source means 7, is employed. FIG. 4(b) shows the luminance distribution diagram of a fragmentary sectional view taken along A-A line of the surface light source device of FIG. 1 when the light guiding plate which is composed of the auxiliary light source means 7 is employed.

As shown in FIG. 4(a), when the auxiliary light source means 7 is not provided, there is shown the highest luminance at the position corresponding to the dot light source 3 and there is shown a decrease in luminance corresponding to the positions in which the middle point of the adjacent dot light sources 3 being connected and the upright surface 5c of the light guiding plate, hence the luminance distribution is uneven.

On the other hand, by providing the auxiliary light source means 7 at the middle point of a line connecting the dot light sources 3 being adjacent to each other and the middle point between the end of dot light source 3 aligned to form a straight line and the upright surface 5c of the light guiding plate 5, luminance also becomes higher around the auxiliary light source means 7, since light is diffused through the auxiliary light source means 7. As shown in FIG. 4(b), unevenness of luminance distribution can be controlled as a whole with combined the part around the dot light source 3 in which luminance is higher. In other words, the auxiliary light source means 7 creates the high-luminance part between scattered dot light sources 3 being adjacent and between the two ends of dot light sources 3 and the upright surface 5c of the light guiding plate 5 as if there is provided a light source. Therefore, through the auxiliary light source means 7, the high luminance around the dot light sources 3 is controlled and it is possible to have homogeneous luminance distribution by having high luminance successively.

Light transmitting inside the light guiding plate 5 which diffusely reflects on a dot-printed area 8 being provided on the base 5a of the light guiding plate 5 corresponding to the opening 1d of the casing 1, and through changing transmitting directions, it is possible to receive light at an incidence angle below a critical angle to a boundary between the light guiding plate 5 and air, then the light is emitted from the opening 1d of the casing 1 which does not include the reflective part 2.

Light emitted from the opening 1d of the casing 1 transmits through optical sheets being composed of the diffusion sheet, protection sheet and lens sheet, then it is received in the element of the liquid crystal display. By aligning a liquid crystal layer through on and off of voltage from an switching element not shown in Figures, light received in the element of the liquid crystal display is modulated according to the image signals and displays each color of red, green and blue.

In Embodiment 1, dot printing 7a is employed as the auxiliary light source means 7, however, as the means of adjusting the luminous intensity distribution of light which transmits inside the light guiding plate 5, it is possible to form unevenness instead of employing dot printing 7a. To form unevenness, there is a method such as to process the light guiding plate 5 by sandblast or to form unevenness on the surface of a mold then form the unevenness when the light guiding plate 5 is formed. These methods are capable of creating unevenness without increasing the components, and it is possible to reduce production costs by not having printing process.

Instead of employing dot printing 7a, a diffuse reflection plate can be adhered to the light guiding plate 5 to avoid exposing to air using an adhesive material having high light transmittance. The diffuse reflection plate can be easily formed in any shape, and there is no high cost such as to create a mold for forming unevenness. Through employing the adhesive material having light transmittance which is the substantially same refractive index as the light guiding plate 5, it is possible to transmit much amount of light to the diffuse reflection plate, since light transmitted to the boundary between the adhesive material and the light guiding plate 5 emits with little refraction.

Figure 5:
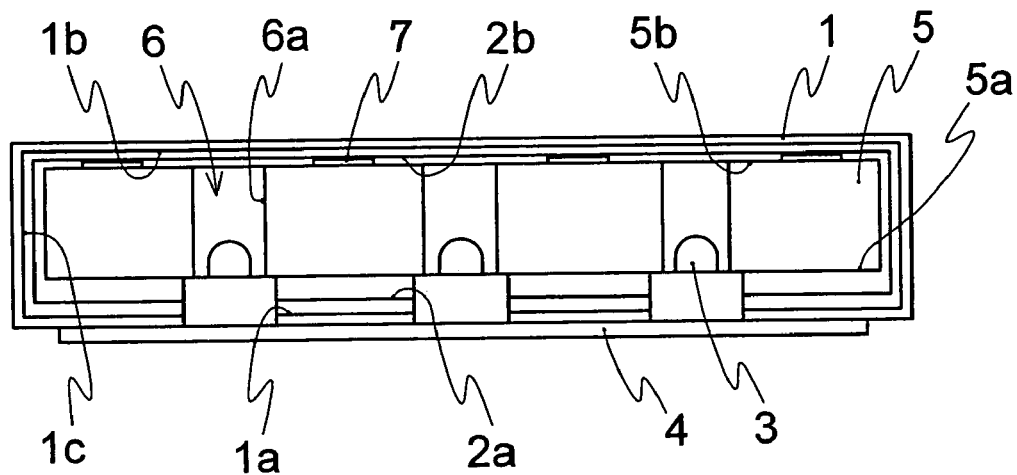
FIG. 5 shows a fragmentary sectional view taken along V-V line of the surface light source device of FIG. 1 in which the auxiliary light source means 7 is provided at the top 5$b$ of the light guiding plate 5.

Furthermore in Embodiment 1, the auxiliary light source means 7 is formed at the base 5a of the light guiding plate 5, however as shown in FIG. 5, the auxiliary light source means 7 can be located at the position which is the top 5b of the light guiding plate 5 and a middle point of a line connecting the dot light sources being adjacent to each other. Through this arrangement, light being irregularly reflected through the auxiliary light source means 7 emits from the top 5b of the light guiding plate 5, and reflects at the secondary reflective part 2b, then the light is received from the top 5b of the light guiding plate 5 again. In addition, light reflected by the base 5a of the light guiding plate 5 irradiates the opening 1d of the casing 1 from the top 5b of the light guiding plate 5. Therefore, compared with the arrangement which the auxiliary light source means 7 is located at the base 5a of the light guiding plate 5, the distance which light is irradiated from the opening 1d of the casing 1 becomes further after being adjusted the luminous intensity distribution through the auxiliary light source means 7. Therefore, the light is distributed over large area, and the homogeneous luminance distribution is further improved. FIG. 5 shows a fragmentary sectional view taken along V-V line of the surface light source device of FIG. 1 when the auxiliary light source means 7 is located at the top 5b of the light guiding plate 5.

Figure 6:
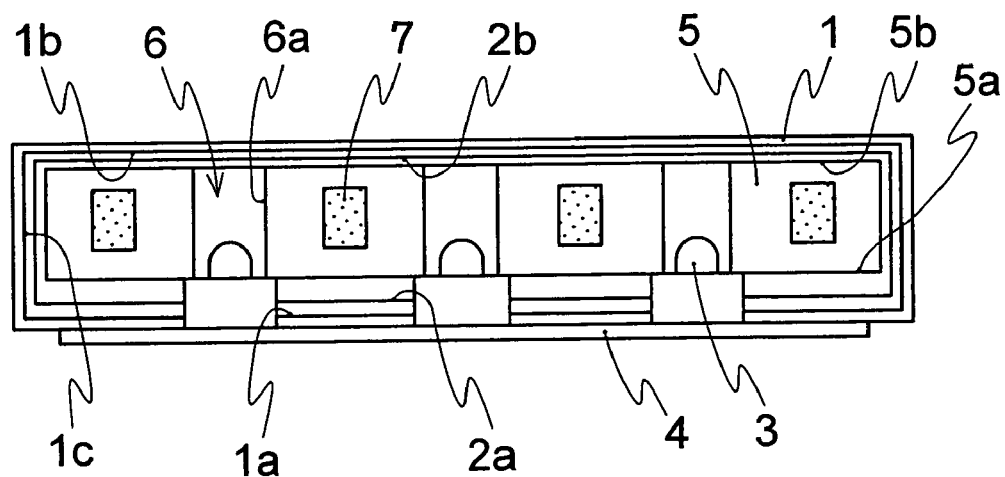
FIG. 6 shows a fragmentary sectional view taken along VI-VI line of the surface light source device of FIG. 1 in which the auxiliary light source means 7 is provided at the upright surface 5$c$ of the light guiding plate 5.

In addition as shown in FIG. 6, it is possible to locate the auxiliary light source means 7 at the upright surface 5c of the light guiding plate, which is parallel and closest to the series of dot light sources and a middle point of a line connecting the dot light sources being adjacent to each other. Through this arrangement, compared with arrangements as mentioned above which are to form the auxiliary light source means 7 either at the base 5a or the top 5b of the light guiding plate 5, the distance between the auxiliary light source means 7 and the opening 1d of the casing 1 becomes further, and the homogeneous luminance is further improved since it is possible to enlarge the range of luminous intensity distribution of light being adjusted by the auxiliary light source means 7 to the opening 1d of the casing 1. FIG. 6 shows a fragmentary sectional view taken along VI-VI line of the surface light source device of FIG. 1 when the auxiliary light source means 7 is located at the upright surface 5c of the light guiding plate 5.

According to the surface light source device in Embodiment 1 of the present invention, the light guiding plate 5 contains the primary hole 6 in such a manner as to locate the each dot light source 3 within the plurality of primary holes. Then, through locating the auxiliary light source means 7 between any two of dot light sources 3 being adjacent to each other, there is created a higher luminance part between scattered dot light sources as if there is provided a light source, and it is possible to improve the homogeneous luminance distribution through controlling the luminance only around the dot light sources 3 and have a higher luminance successively.

Embodiment 2

Figure 7:
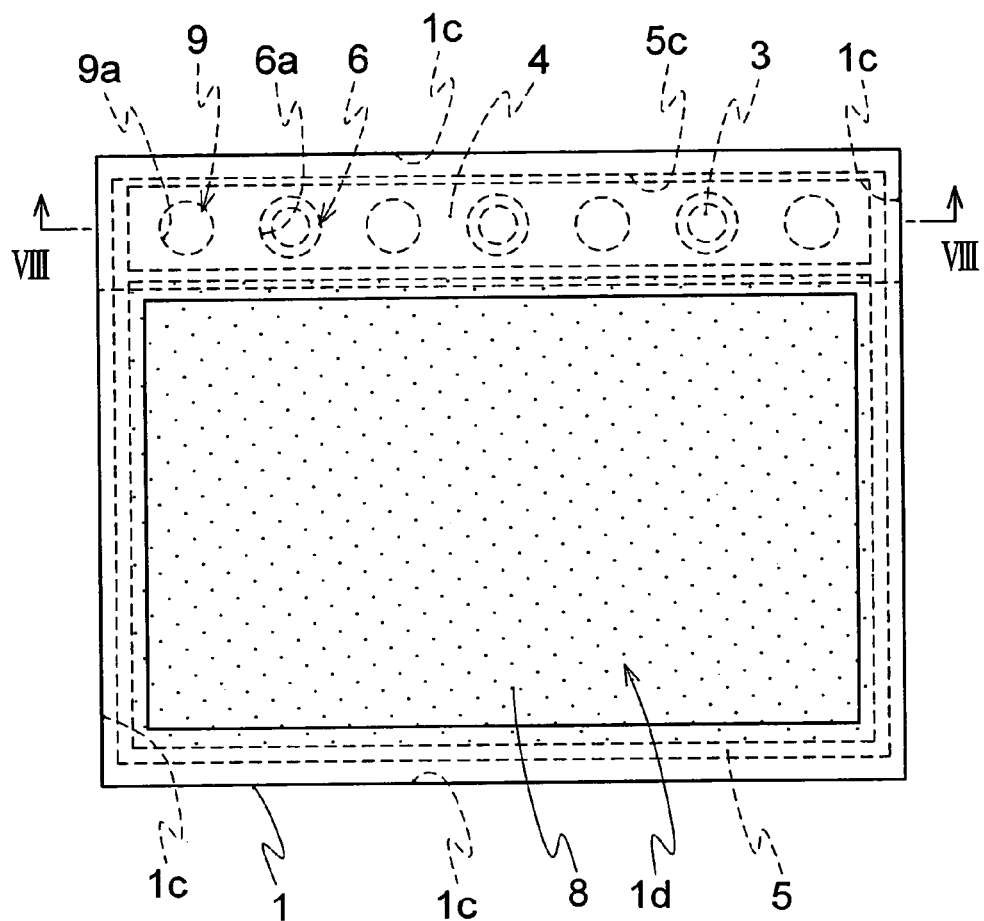
FIG. 7 shows a plan view of the basic construction of the surface light source device in Embodiment 2 of the present invention.
Figure 8:
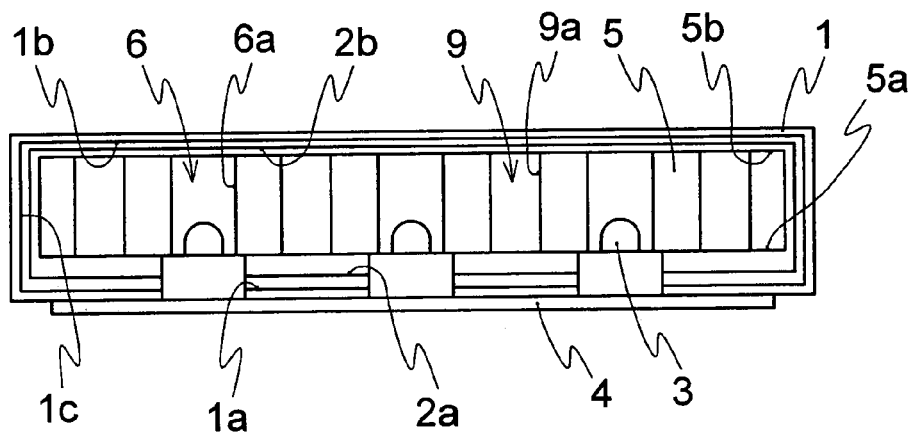
FIG. 8 shows a fragmentary sectional view taken along VIII-VIII line of the surface light source device of FIG. 7.

FIG. 7 shows a plan view of a basic construction of a surface light source device in Embodiment 2 of the present invention and FIG. 8 shows a fragmentary sectional view taken along VIII-VIII line of the surface light source device of FIG. 7. In FIGS. 7 and 8, the same Numerals correspond to the same parts as shown in FIGS. 1 to 6, therefore, explanations are omitted. With respect to the auxiliary light source means 7, there is provided a substantially circular-shaped secondary hole 9 which is located at the light guiding plate 5 and penetrated between the middle point of a line connecting the dot light sources 3 being adjacent to each other on the top 5b of the light guiding plate 5 and the middle point of a line connecting the dot light sources 3 being adjacent to each other on the base 5a of the light guiding plate 5. In addition, a plurality of the dot light sources 3 is aligned to form a straight line and forms a series of dot light sources, and the secondary hole 9 is also formed at the middle point of the end of the dot light sources 3 and the upright surface 5c of the light guiding plate 5. The only difference between Embodiment 1 and Embodiment 2 is that the auxiliary light source means 7 is provided by the secondary hole 9, and Embodiment 2 has the same effects as Embodiment 1 except the effects of the secondary hole 9 which will be mentioned in following.

In Embodiment 2, as shown in FIGS. 7 and 8, the secondary hole 9 is formed to penetrate between the base 5a and the top 5b of the light guiding plate 5 and serves as the auxiliary light source means 7. Since inside the secondary holes contains air which has a refractive index of 1, some portion of light reached at inside surface 9a being composed of the secondary hole 9 reflects at the inside surface 9a, and other portion of light reflects at the inner side 9a and the light is received inside the secondary hole 9. Light being received inside the secondary hole 9 transmits in the air inside the secondary hole 9 and refracts at the inner side 9a of the secondary hole 9 again, then it is received in the light guiding plate 5.

Through the secondary hole 9, there is adjusted the luminous intensity distribution by either reflecting or refracting light, and there is created a higher luminance part between the adjacent dot light sources 3 being located scatteringly as if there is provided a light source. Then the higher luminance part around the dot light sources 3 is controlled, and it is possible to have homogeneous luminance distribution by having higher luminance successively. Also, by forming the secondary hole 9 at the same time when molding the light guiding plate 5, it is possible to form the auxiliary light source means with low costs since there is no need to increase the number of components.

In Embodiment 2 of the present invention, the inner side 9a being consisted the secondary hole 9 is perpendicular to either the base 5a or top 5b of the light guiding plate 5 and it is not an uneven formed mirror. However, by forming the subtle unevenness on the inside surface 9a, light is diffused further and it is desirable.

Also, the secondary hole 9 does not have to be penetrated between the base 5 and the top 5b of the light guiding plate 5.

In addition, it is possible to have a plurality of the secondary holes 9, and the position and the form of the secondary holes 9 can be adjusted so as to have a homogeneous luminance distribution.

Figure 9:
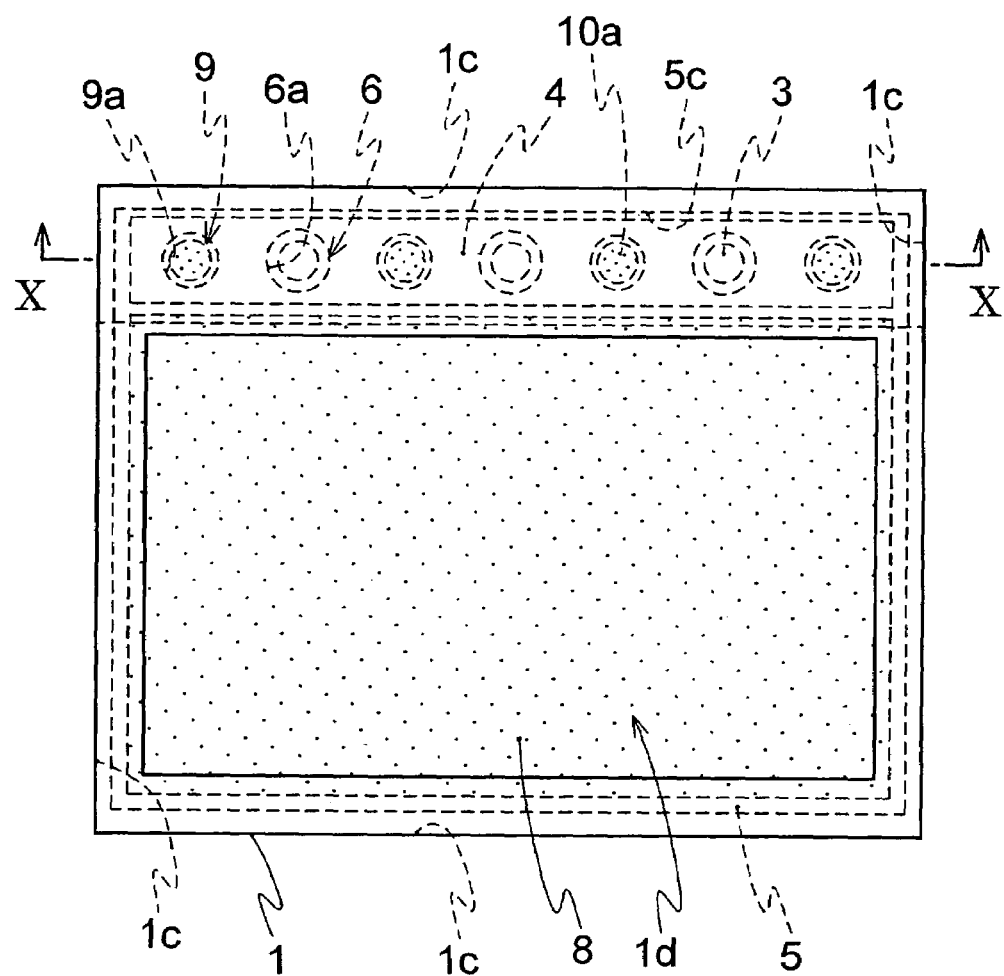
FIG. 9 shows a plan view of the basic construction of other surface light source device in Embodiment 2 of the present invention.
Figure 10:
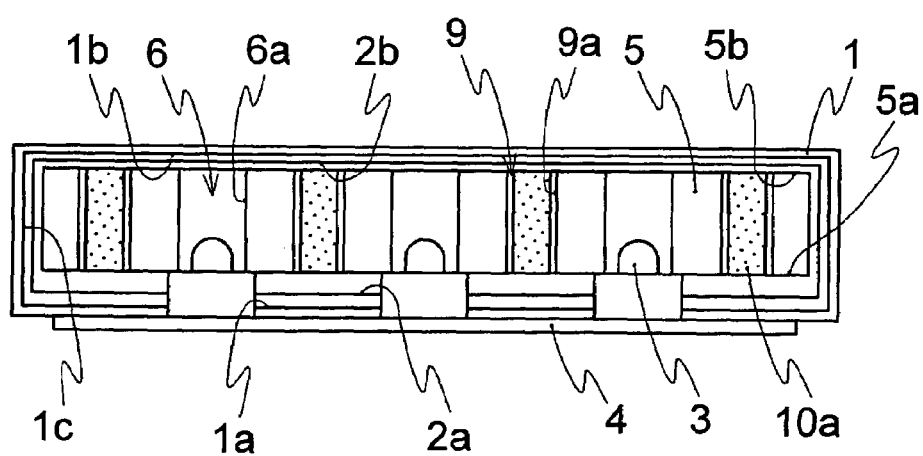
FIG. 10 shows a fragmentary sectional view taken along X-X line of the surface light source device of FIG. 9.

Furthermore, in Embodiment 2, inside the secondary hole 9 serving as the auxiliary light source means 7 contains air, however as shown in FIGS. 9 and 10, through mounting a member which diffuses light 10*a* (hereinafter, light dispersing member) consisting such as PC (polycarbonate) and ABS (acrylonitrile butadiene styrene), light received inside the secondary hole 9 from inside the light guiding plate 5 diffusely reflects on the surface of the light dispersing member 10*a*, and the light is received in the light guiding plate 5 from inside surface 9*a* of the secondary hole 9 again. Through this arrangement, light from the light source 3 is diffused further through not only the refraction by the difference of the refraction index between the air inside the secondary hole 9 and light guiding plate 5, but also from the dispersed diffusion by the light dispersing member 10*a*, therefore, it is possible to obtain the homogeneous luminance on a display surface. FIG. 9 shows a plan view of a basic construction of other surface light source device in Embodiment 2 and FIG. 10 is a fragmentary sectional view taken along X-X line of the surface light source device of FIG. 9.

In case when the secondary hole 9 is not penetrated between the base 5*a* and the top 5*b* of the light guiding plate 5, the light dispersing member 10*a* is inserted from the side in which the secondary hole 9 is formed at either the base 5*a* or top 5*b* of the light guiding plate 5.

The sectional shape of the light dispersing member 10*a* is selected from any shapes such as triangular shape, quadrangular shape or star shape.

The member molded into the secondary holes 9 is not limited to the light dispersing member 10*a*, and a regular reflection member or a transparent member having a different refraction index from the refraction index of the light guiding plate 5 can be employed. In case a transparent member which has a different refraction index from a refraction index of the light guiding plate 5 is employed, through employing a transparent member having a larger refractive index than the refraction index of the light guiding plate 5, the light is received inside the secondary hole 9 with smaller angle of emission compared with the incident angle being received at the inside surface 9*a* of the secondary hole 9 from the light guiding plate 5, and it is possible to control the loss of reflection at the reflective part 2.

Embodiment 3

Figure 11:
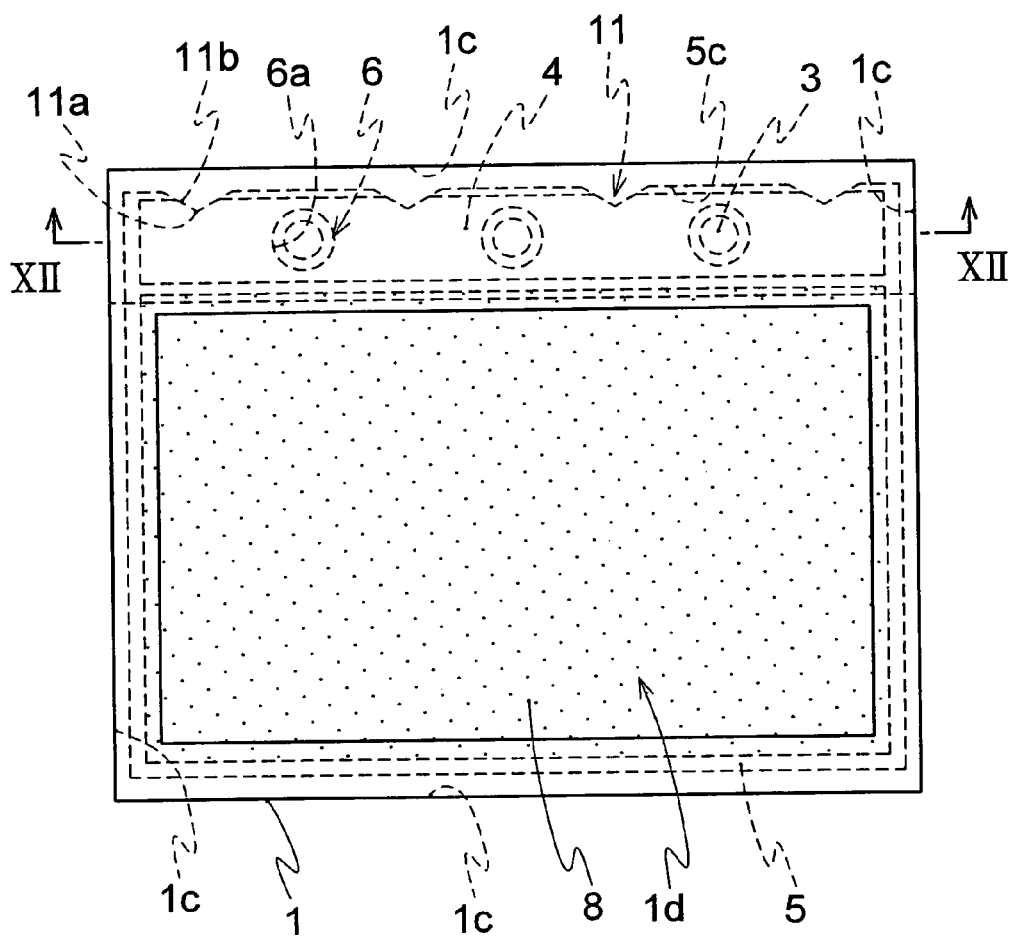
FIG. 11 shows a plan view of the basic construction of the surface light source device in Embodiment 3 of the present invention.
Figure 12:
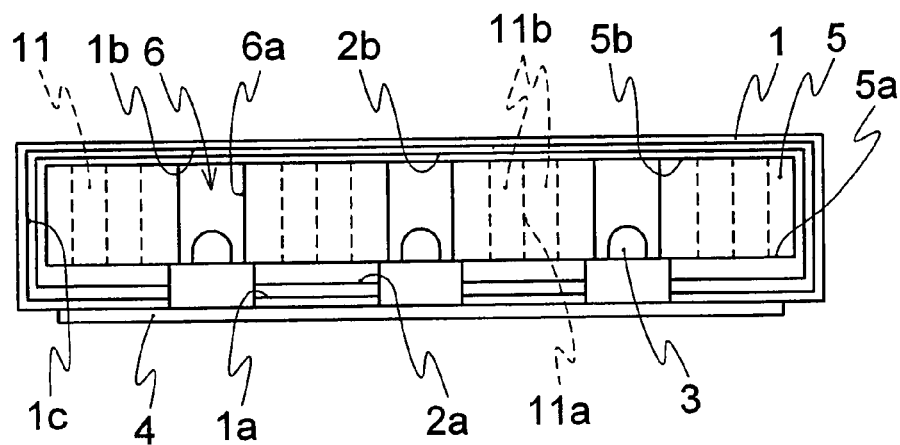
FIG. 12 shows a fragmentary sectional view taken along XII-XII line of the surface light source device of FIG. 11.

FIG. 11 shows a plan view of a basic construction of a surface light source device in Embodiment 3 of the present invention and FIG. 12 shows a fragmentary sectional view taken along XII-XII line of the surface light source device of FIG. 11. In FIGS. 11 and 12, the same Numerals correspond to the same parts as shown in FIGS. 1 to 11, therefore, explanations are omitted. In Embodiment 3, a convex surface serving as the auxiliary light source means 7 is defined by forming the light guiding plate 5 into a V-shaped groove 11 on a reverse side to the other side opposing to the dot light sources 3. In FIGS. 11 and 12, there are formed a plurality of convex surfaces on an upright surface of the light guiding plate 5, the above-mentioned upright surface is located behind the closest side of the dot light sources 3 being adjacent to each other. The convex surfaces are provided on the upright surface at positions between the dot light sources 3 being adjacent to each other, in addition to the positions between both ends of the dot light sources 3 and the both sides of upright surfaces being located perpendicular to the upright surface in which a plurality of convex surfaces is formed. The only difference between the present Embodiment 3 and Embodiments 1 and 2 is that the auxiliary light source means 7 consists the V-shaped groove 11, and Embodiment 3 has the same effects as Embodiments 1 and 2 except the effects of the V-shaped groove 11 which will be mentioned in following.

In Embodiment 3, as shown in FIGS. 11 and 12, through the convex surfaces which are the opposing side of formed V-shaped grooves 11 and serve as the auxiliary light source means 7, light reached at the convex surface 11*b* of the opposing side of the V-shaped groove 11 from the light guiding plate 5, reflects at the convex surface 11*b* of the opposing side of V-shaped groves 11 through the difference of the refraction index between the light guiding plate 5 and air. Or, light is reflected at the convex surface 11*b* of the opposing side of the V-shaped groove 11, and reflected at the reflective part 2 being provided along the upright surface 5*c* of the light guiding plate, and then received inside the light guiding plate 5 from the convex surface 11*b* of the opposing side of the V-shaped groove 11 again.

Through the convex surface located opposing side of the V-shaped groove 11, there is adjusted the luminous intensity distribution by either reflecting or refracting light, and there is created a higher luminance part between the adjacent dot light sources 3 being located scatteringly as if there is provided a light source. Then the higher luminance part around the dot light sources 3 is controlled, therefore, it is possible to have homogeneous luminance distribution by having higher luminance successively. Also, by forming the V-shaped groove 11 at the same time when molding the light guiding plate 5, it is possible to form the auxiliary light source means with low costs, since there is no need to increase the number of components.

In Embodiment 3 of the present invention, the convex surface 11*b* located opposing side of the V-shaped groove 11 is provided perpendicular to the base 5*a* and top 5*b* of the light guiding plate 5 and it is not an uneven formed mirror. However, by forming the subtle unevenness on the side 11*b*, light is diffused further and it is desirable.

Figure 13:
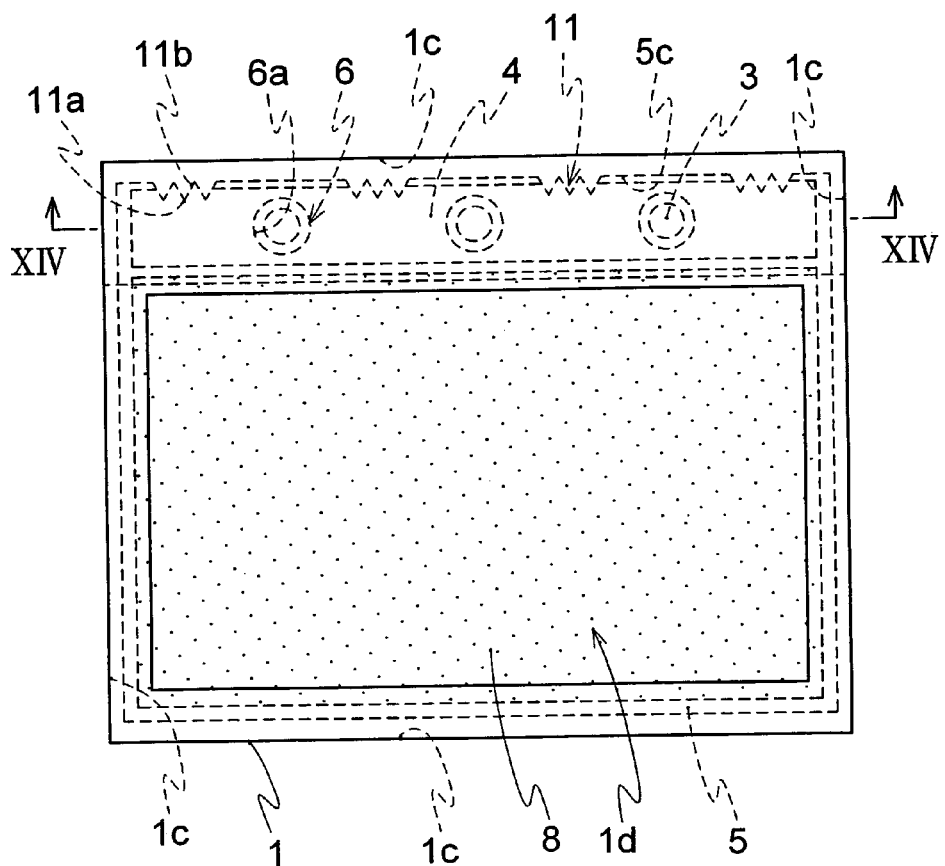
FIG. 13 shows a plan view of the basic construction of other surface light source device in Embodiment 3 of the present invention.
Figure 14:
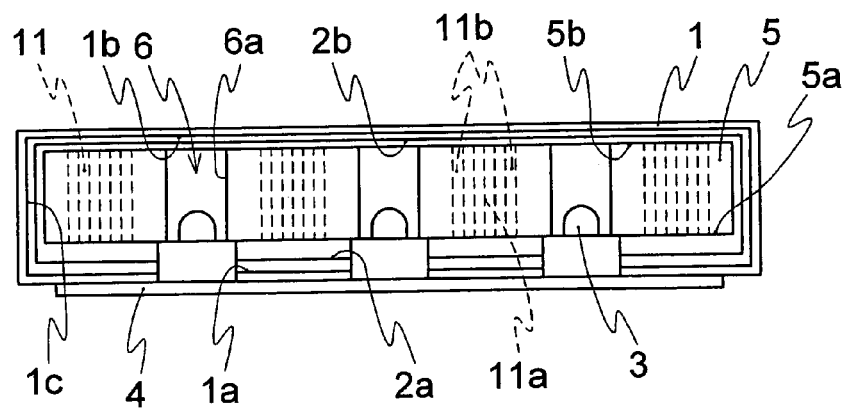
FIG. 14 shows a fragmentary sectional view taken along XIV-XIV line of the surface light source device of FIG. 13.

As shown in FIGS. 13 and 14, there can be employed a plurality of the V-shaped grooves 11 at one spot, and the forms such as the size of the V-shaped groove 11 and the angle being created by a pair of the convex surfaces 11*b* can be adjusted in any form so as to obtain the homogeneous luminous distribution of the display surface. FIG. 13 is a plan view of the basic construction of other surface light source device in Embodiment 3 of the present invention, and FIG. 14 is a fragmentary sectional view taken along XIV-XIV line of the surface light source device of FIG. 13.

Figure 15:
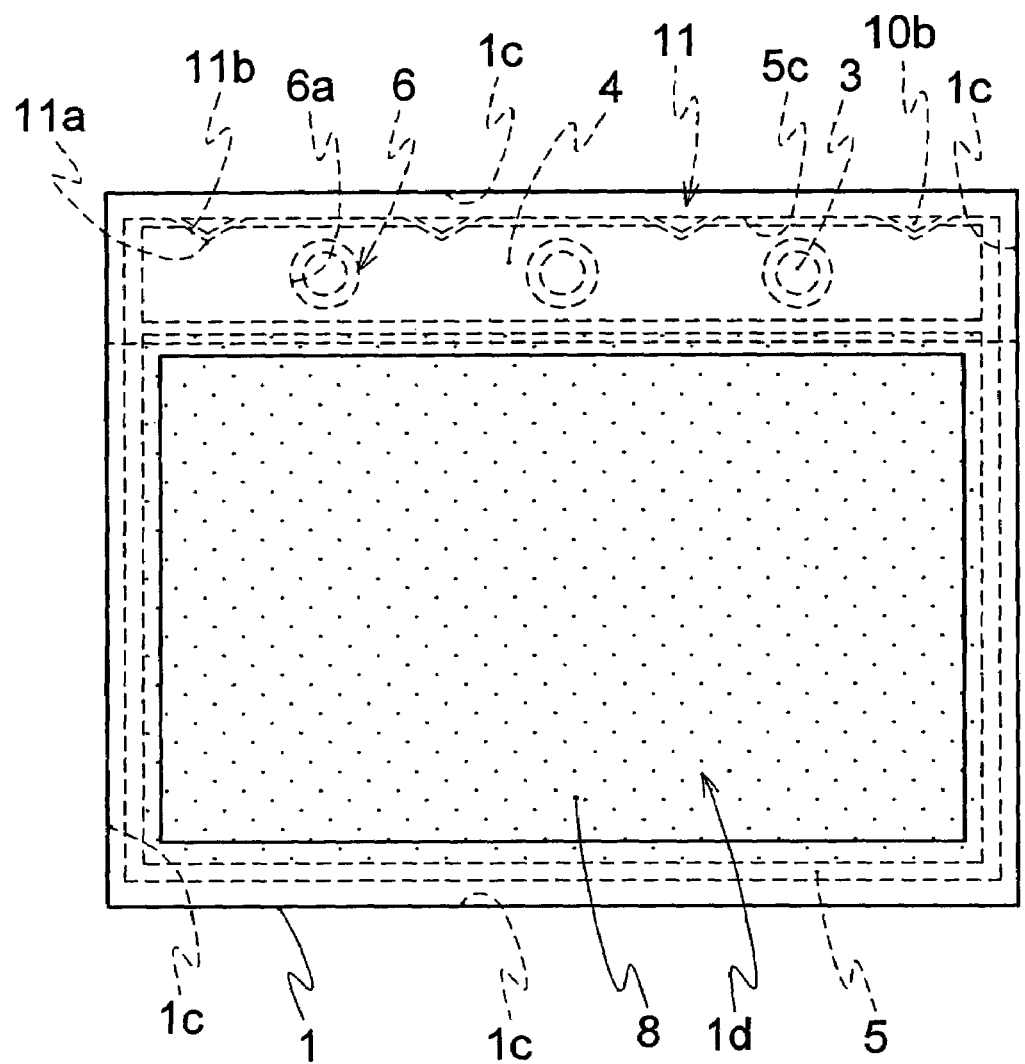
FIG. 15 shows a plan view of the basic construction of another surface light source device in Embodiment 3 of the present invention.

Furthermore, in Embodiment 3, inside the V-shaped groove 11 being employed to form the auxiliary light source means 7 contains air. However as shown in FIG. 15, through mounting a triangular-shaped pole of the light dispersing member 10*b* being consisted such as PC (polycarbonate) and ABS (acrylonitrile butadiene styrene) inside the V-shaped groove 11, light received inside the V-shaped groove 11 from inside the light guiding plate 5 diffusely reflects on the surface of the light dispersing member 10*b*, and the light is incident on the light guiding plate 5 from the convex surface 11*b* located opposing side of the V-shaped groove 11 again. Through this arrangement, light from the light source 3 is diffused further through not only the refraction from the difference of the refraction index between the air inside the V-shaped groove 11 and light guiding plate 5, but also from the dispersed diffusion by the light dispersing member 10*b*, therefore, it is possible to obtain an homogeneous luminance on a display surface. FIG. 15 shows a plan view of a basic construction of another surface light source device in Embodiment 3.

There can be employed a plurality of the light dispersing members 10b, and the sectional shape of the light dispersing member 10b can be in any shape.

The member mounted to the V-shaped groove 11 is not limited to the light dispersing member 10b, and a regular reflection member or a transparent member having a different refraction index from the refraction index of the light guiding plate 5 can be employed.

As explained above, through employing the each component as the auxiliary light source means, light guiding plate and light dispersing material with various forms, positions and materials, it has been obtaining the effects from each different component. However, it is expected to obtain further effects through employing the combinations of various kinds of components.

In above explanation, the white light source is employed as the dot light sources in the present invention. However, it is possible to apply for each Embodiment when white light which is a mixture of R (red), G (green) and B (blue) is employed, and through the equalization of the luminance for each color, it is possible to control not only the unevenness of luminance but also the occurrence of the unevenness of color, and the even white light can be obtained.

Though several Embodiments of the present invention are described above, it is to be understood that the present invention is not limited only to the above-mentioned, various changes and modifications may be made in the invention without departing from the sprit and scope thereof.

What is claimed is:

1. A surface light source device comprising:
a casing having an opening;
a primary reflective part provided at a base of said casing in contrast to said opening;
a plurality of dot light sources provided at a side of said casing base; and
a light guiding plate provided on said primary reflective part located inside said casing and transmitting light to said opening from said dot light sources;
wherein said light guiding plate is provided with a plurality of primary holes arranged in a row and perpendicular to a base of the light guiding plate in such a manner as to locate each said dot light source within said plurality of primary holes, and said light guiding plate comprises a plurality of auxiliary light source diffusing means which diffuses reflection from said dot light sources, said plurality of auxiliary light source diffusing means being located between any two of the dot light sources which are adjacent to each other and each of said auxiliary light source diffusing means is include a center located only at a middle point on a line connecting a center point of any two of said adjacent dot light sources, the auxiliary light source diffusing means not overlapping said plurality of primary holes in a direction perpendicular to the base of the light guide plate.

2. The surface light source device of claim 1, wherein said plurality of auxiliary light source diffusing means are located at the base of said light guiding plate.

3. The surface light source device of claim 1, wherein said plurality of auxiliary light source diffusing means are located at the top of said light guiding plate.

4. The surface light source device of claim 1 comprising:
a plurality of dot light sources is aligned to form a straight line and forms a series of dot lights; and
said plurality of auxiliary light source diffusing means are formed at an upright surface of said light guiding plate located at a position which is parallel and behind a closest side of said dot light sources.

5. The surface light source device according to claim 1, wherein a dot density of the auxiliary light source diffusing means diminishes as the distance from the center point increases.

6. A surface light source device comprising:
a casing having an opening;
a primary reflective part provided at a base of said casing in contrast to said opening;
a plurality of dot light sources provided at a side of said base; and
a light guiding plate provided on said primary reflective part located inside said casing and transmitting light to said opening from said dot light sources;
wherein said light guiding plate is provided with a plurality of primary holes in such a manner as to locate each said dot light source within said plurality of primary holes, and said light guiding plate comprises an auxiliary light source diffusing means which diffuses reflection from said dot light sources, wherein the auxiliary light source diffusing means is located between said dot light sources and includes a center located only at a middle point on a line connecting center points of any two of the dot light sources which are adjacent to each other; and
wherein each said primary hole is penetrated between the base and top of said light guiding plate, and comprises a secondary reflective part located at least at said primary hole at a top side of said light guiding plate.

7. A surface a light source device comprising:
a casing having an opening;
a primary reflective part provided at a base of said casing in contrast to said opening;
a plurality of dot light sources provided at a side of said base; and
a light guiding plate provided on said primary reflective part located inside said casing and transmitting light to said opening from said dot light sources;
wherein said light guiding plate is provided with a plurality of primary holes in such a manner as to locate each said dot light source within said plurality of primary holes, and said light guiding plate comprises an auxiliary light source diffusing means which diffuses reflection from said dot light sources, said auxiliary light source diffusing means is a secondary hole being formed to penetrate positions between a top and a base of said light guiding plate and is located between any two of the dot light sources which are adjacent to each other and said positions are located at a middle point between any two adjacent said dot light sources.

8. A surface light source device comprising:
a casing having an opening;
a primary reflective part provided at a base of said casing in contrast to said opening;
a plurality of dot light sources provided at a side of said base; and
a light guiding plate provided on said primary reflective part located inside said casing and transmitting light to said opening from said dot light sources;
wherein said light guiding plate is provided with a plurality of primary holes in such a manner as to locate each said dot light source within said plurality of primary holes, and said light guiding plate comprises an auxiliary light source diffusing means which diffuses reflection from said dot light sources, said auxiliary light source diffusing means located between any two of the dot light sources which are adjacent to each other;

said auxiliary light source diffusing means is a secondary hole being formed to penetrate positions between a top and a base of said light guiding plate;

said positions are located at a middle point between any two adjacent said dot light sources, and a member diffusing light to said secondary hole is mounted on an upright surface of the light guiding plate.

9. A surface light source device comprising: a casing having an opening;

a primary reflective part provided at a base of said casing in contrast to said opening;

a plurality of dot light sources provided at a side of said base; and a light guiding plate provided on said primary reflective part located inside said casing and transmitting light to said opening from said dot light sources;

wherein said light guiding plate is provided with a plurality of primary holes in such a manner as to locate each said dot light source within said plurality of primary holes, and said light guiding plate comprises an auxiliary light source diffusing means which diffuses reflection from said dot light sources, the auxiliary light source diffusing means located between said dot light sources and include a center located only at a middle point on a line connecting center points of any two of the dot light sources which are adjacent to each other; and wherein said auxiliary light source diffusing means is formed by an unevenness formed on a surface of said light guiding plate.

10. A surface light source device comprising: a casing having an opening;

a primary reflective part provided at a base of said casing in contrast to said opening;

a plurality of dot light sources provided at a side of said base; and a light guiding plate provided on said primary reflective part located inside said casing and transmitting light to said opening from said dot light sources;

wherein said light guiding plate is provided with a plurality of primary holes arranged in a row and perpendicular to a base of the light guiding plate in such a manner as to locate each said dot light source within said plurality of primary holes, and said light guiding plate comprises an auxiliary light source diffusing means which diffuses reflection from said dot light sources, said auxiliary light source diffusing means being located between any two of the dot light sources which are adjacent to each and each of said auxiliary light source diffusing means include a center located at a middle point on a line connecting a center point of any two of adjacent dot light sources, the auxiliary light source diffusing means not overlapping said plurality of primary holes in a direction perpendicular to the base of the light guide plate; and said auxiliary light source diffusing means is formed by dot printing on said light guiding plate.

\* \* \* \* \*